United States Patent
Lee et al.

(10) Patent No.: US 7,430,750 B2
(45) Date of Patent: Sep. 30, 2008

(54) OPTICAL DISC DRIVE USING NOISE REDUCING UNIT

(75) Inventors: Sang-yun Lee, Seoul (KR); Myung-ryul Choi, Seoul (KR); Eun-hyoung Cho, Seoul (KR); Suk-il Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 10/895,983

(22) Filed: Jul. 22, 2004

(65) Prior Publication Data

US 2005/0086675 A1  Apr. 21, 2005

(30) Foreign Application Priority Data

Jul. 23, 2003 (KR) .................... 10-2003-0050507

(51) Int. Cl.
*G11B 17/04* (2006.01)
*G11B 33/14* (2006.01)

(52) U.S. Cl. ..................... 720/648; 720/703

(58) Field of Classification Search ............... 720/611, 720/648, 651, 698, 703, 712
See application file for complete search history.

(56) References Cited

U.S. PATENT DOCUMENTS

| | | | | |
|---|---|---|---|---|
| 4,329,722 A * | 5/1982 | West | ........................ | 360/97.03 |
| 5,751,688 A * | 5/1998 | Mizuno et al. | ............... | 720/711 |
| 6,493,310 B1 * | 12/2002 | Kim et al. | ..................... | 720/611 |
| 6,643,251 B1 * | 11/2003 | Ikuta et al. | ................... | 720/703 |
| 6,817,023 B2 * | 11/2004 | Minase | ........................ | 720/648 |
| 6,862,738 B2 * | 3/2005 | Wu et al. | ..................... | 720/651 |
| 6,952,833 B2 * | 10/2005 | Chang | ........................ | 720/648 |
| 6,958,884 B1 * | 10/2005 | Ojeda et al. | ............... | 360/97.02 |
| 2003/0133390 A1 * | 7/2003 | Chuang | ..................... | 369/75.2 |
| 2004/0004928 A1 * | 1/2004 | Choi | ........................ | 369/75.2 |
| 2004/0205788 A1 * | 10/2004 | Choi et al. | ................... | 720/611 |
| 2004/0216153 A1 * | 10/2004 | Ota | ............................. | 720/703 |
| 2005/0114875 A1 * | 5/2005 | Sato | .............................. | 720/648 |
| 2005/0198658 A1 * | 9/2005 | Yu | ................................. | 720/648 |
| 2006/0005214 A1 * | 1/2006 | Kim et al. | .................... | 720/648 |

FOREIGN PATENT DOCUMENTS

JP  2000-285555  10/2000
KR  2003-0060001  7/2003

OTHER PUBLICATIONS

Korean Office Action issued on Apr. 30, 2005.

* cited by examiner

*Primary Examiner*—Brian E Miller
(74) *Attorney, Agent, or Firm*—Staas & Halsey LLP (57) ABSTRACT

An optical disc drive including a main frame in which a turntable is provided; a tray on which the optical disc is mounted and which is slidable in the main frame; a cover, which covers a top surface of the main frame and includes a clamper to fix the optical disc in the turntable; and a noise reducer, which is disposed in the cover and causes air generated by rotation of the optical disc circulate from an inner circumference to an outer circumference of the optical disc and from the outer circumference to the inner circumference thereof, thereby reducing noise.

24 Claims, 5 Drawing Sheets

OPTICAL DISC DRIVE USING NOISE REDUCING UNIT

CROSS-REFERENCE TO RELATED APPLICATIONS

This application claims the priority of Korean Patent Application No. 2003-50507, filed on Jul. 23, 2003, in the Korean Intellectual Property Office, the disclosure of which is incorporated herein in its entirety by reference.

BACKGROUND OF THE INVENTION

1. Field of the Invention

The present invention relates to an optical disc drive, and more particularly, to an optical disc drive using a noise reducing unit for reducing noise generated by air flow due to the rotation of a disc.

2. Description of the Related Art

Typically, optical disc drives are devices which write or read information by radiating light on an optical medium (hereinafter, referred to as an optical disc) having a disc shape, such as a compact disc (CD) or a digital versatile disc (DVD).

Figure 1:
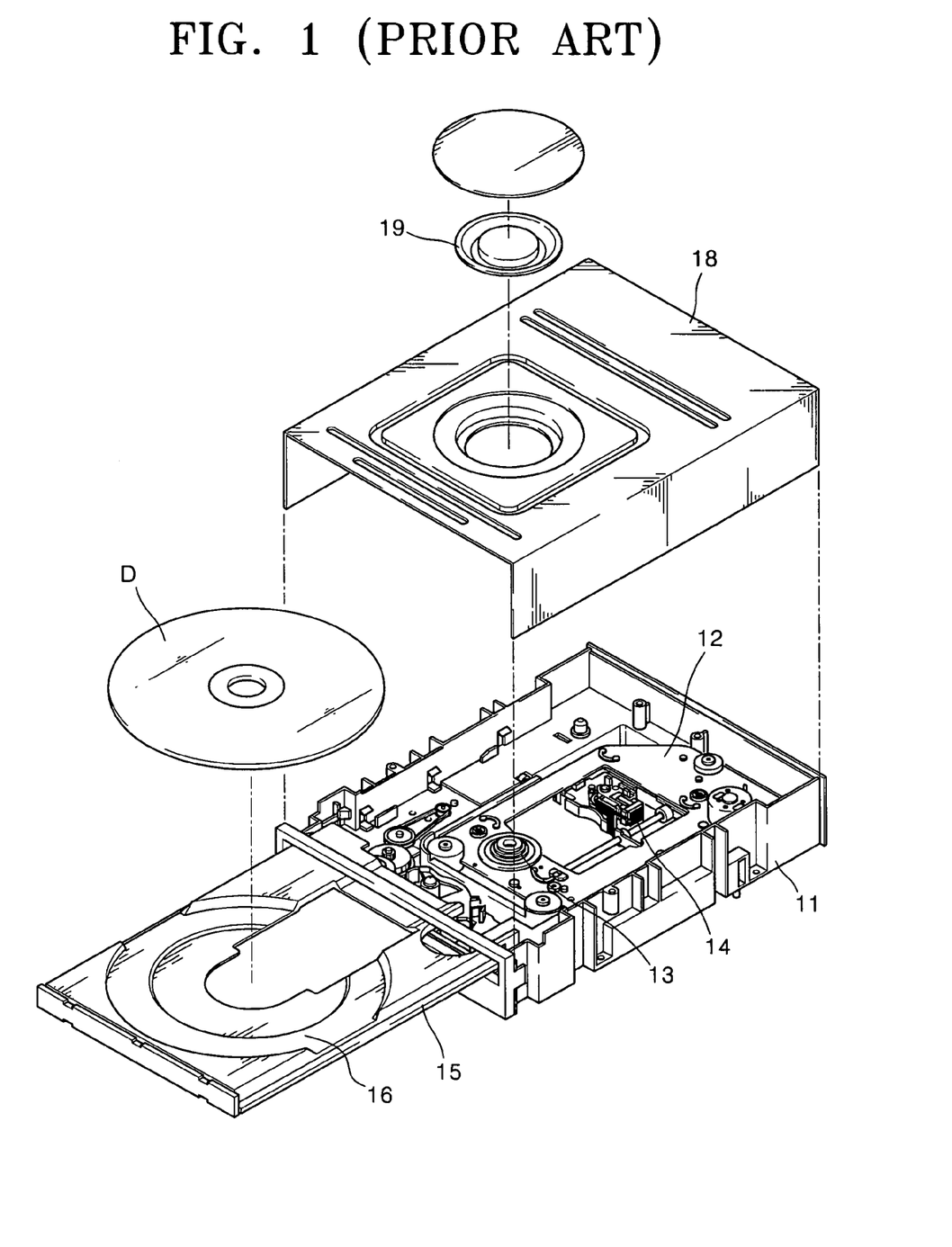
FIG. 1 is an exploded perspective view showing a conventional optical disc drive.

FIG. 1 shows a structure of a conventional optical disc drive. Referring to FIG. 1, the conventional optical disc drive includes a main frame 11, a tray 15, and a cover 18.

A spindle motor (not shown) is installed in the main frame 11. The spindle motor has a turntable 13, on which an optical disc D is mounted, and an optical pickup 14, which makes a reciprocating motion in a radial direction of the optical disc D, and records information on the optical disc D or reproduces the information recorded on the optical disc D. The main frame 11 includes a sub-chassis 12 which moves upwards and downwards with respect to the main frame 11.

The tray 15 is installed at the main frame 11 to be able to slide and includes a mounting portion on which the optical disc D is seated.

The cover 18 is installed to cover the top surface of the main frame 11. The cover 18 presses and supports the optical disc D mounted on the turntable 13.

The optical disc D, seated on the tray 15 and inserted into the main frame 11, is mounted on the turntable 13, supported by the clamper 19, and is rotated by the spindle motor (not shown) at high speed.

Noise generated by the high-speed rotation of an optical disc in a high-speed and high-density optical disc drive has been a serious problem in the development of high performance optical disc drives. The noise is generated as a result of various noise generating causes. These include, but are not limited to friction of the surface of the optical disc with air, a pressure difference between inner and outer circumferences of the optical disc, collision of air from an external surface of the optical disc with walls of an optical disc mounting portion disposed in a tray, and air turbulence around the rotating optical disc. The noise escapes through a gap between a door and a main body case, increasing the whole noise of the optical disc.

SUMMARY OF THE INVENTION

The present invention provides an optical disc drive having an improved structure in which a pressure difference between inner and outer circumferences of an optical disc is reduced, the flow speed of air is lowered, and noise caused by air turbulence in the optical disc drive and flow noise in the optical disc are reduced.

According to an aspect of the present invention, an optical disc drive comprises a main frame in which a turntable is provided; a tray on which the optical disc is mounted and which is slidable in the main frame; a cover, which covers a top surface of the main frame and includes a clamper to fix the optical disc in the turntable; and a noise reducer, which is disposed in the cover and causes air, generated by rotation of the optical disc, to circulate from an inner circumference to an outer circumference of the optical disc and from the outer circumference to the inner circumference thereof. According to this arrangement, this air flow reduces noise.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
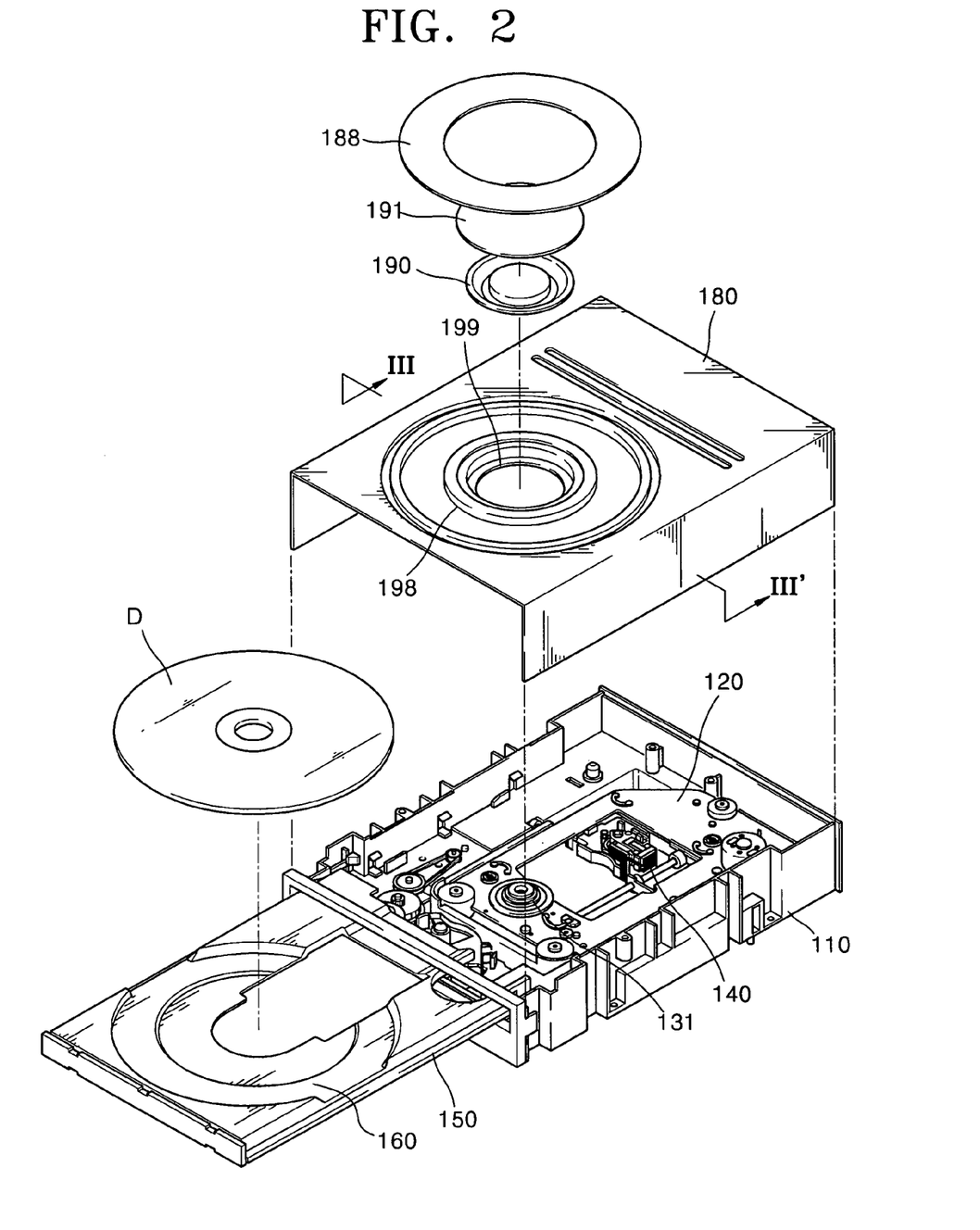
FIG. 2 is an exploded perspective view showing an optical disc drive using a noise reducing unit according to an exemplary embodiment of the present invention.

Referring to FIG. 2, an optical disc drive using a noise reducer according to an embodiment of the present invention includes a main frame 110, a tray 150, and a cover 180.

The main frame 110 includes a sub-chassis 120 which moves upwards and downwards with respect to the main frame 11. A turntable 131, on which an optical disc D is mounted, is disposed in the sub-chassis 120. A spindle motor (130 of FIG. 5), which rotates the turntable 131, and an optical pickup 140, which makes a reciprocating motion in a radial direction of the optical disc D and records information on the optical disc D or reproduces the information recorded on the optical disc D, are installed in the sub-chassis 120.

The tray 150 is slidable in the main frame 110 and includes a mounting portion 160 on which the optical disc D is seated.

The cover 180 covers the top surface of the main frame 110 and a camper mounting portion 198, on which a clamper 190 having a circular shape to fix the optical disc D is mounted along with the turntable 131, is disposed in the cover 180. A clamper supporting portion 199 which supports the clamper 190, is formed under the clamper mounting portion 198 to protrude from the clamper mounting portion 198 in a circular shape. A clamper cover 191 which covers the clamper mounting portion 198 after the clamper 190 is mounted on the clamper mounting portion 198, is formed on the surface of the clamper mounting portion 198.

A magnet 192 (FIG. 3) is disposed in the clamper 190 to correspond to a magnet 132 (FIG. 5) disposed in the turntable 131. Thus, if the optical disc D mounted on the tray 150 is loaded on the main frame 110, the turntable 131 and the clamper 190 are combined by the magnets 132 and 192 so that the optical disc D is fixed.

The cover 180 further includes a noise reducer which makes the air, which surrounds the optical disc D when the optical disc D is rotated by the spindle motor 130 at high speed, be circulated from an inner circumference to an outer circumference of the optical disc D and from the outer circumference to the inner circumference thereof, thereby reducing noise generated by air flow.

The noise reducer works like an automobile muffler. That is, as with an automobile muffler, an exhaust gas passes through a pressure tube having a small cross-section, then passes through an expansion tube having a large cross-section, thereby decreasing the sound energy density into gas. Thus, when the exhaust gas passes through an exhaust tube, noise is reduced.

Figure 3:
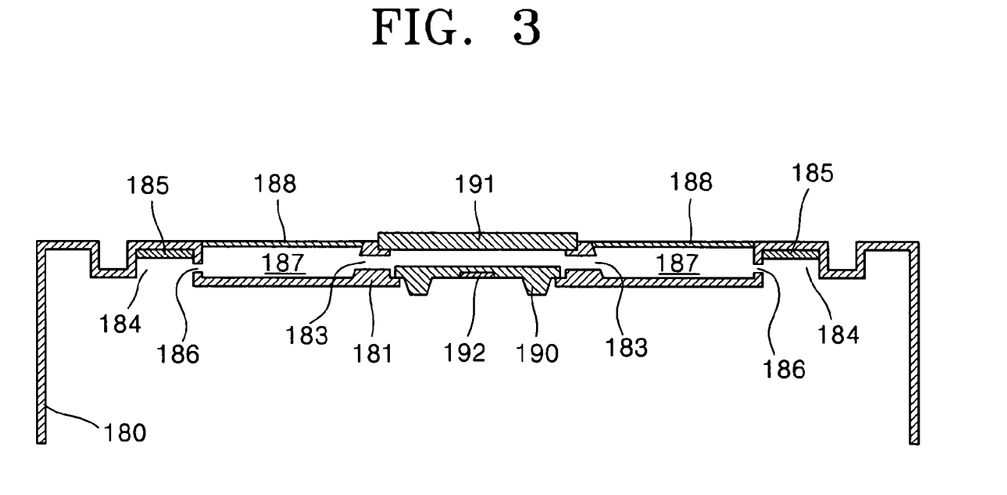
FIG. 3 is a cross-sectional view taken along a line III-III' of FIG. 2.

To achieve the above related effect, as shown in FIG. 3, the noise reducer includes a space portion 187 having a predetermined concave area on the top surface of the cover 180 to surround the clamper mounting portion 181. The space portion 187 is isolated from the outside by a sealing portion 188 placed on the top surface of the space portion 187. Thus, the air flows through the space portion 187.

An extension portion 184 having a predetermined space is adjacent to the space portion 187. An acoustic absorbent 185 is put in the extension portion 184 to absorb sound energy. When the optical disc D is rotated, the extension portion 184 decreases the density of air flow through a gap C (FIG. 5) between the top surface of the optical disc D and the cover 180, thereby reducing noise. In addition, the acoustic absorbent 185 absorbs the sound energy and also reduces noise.

Figure 4:
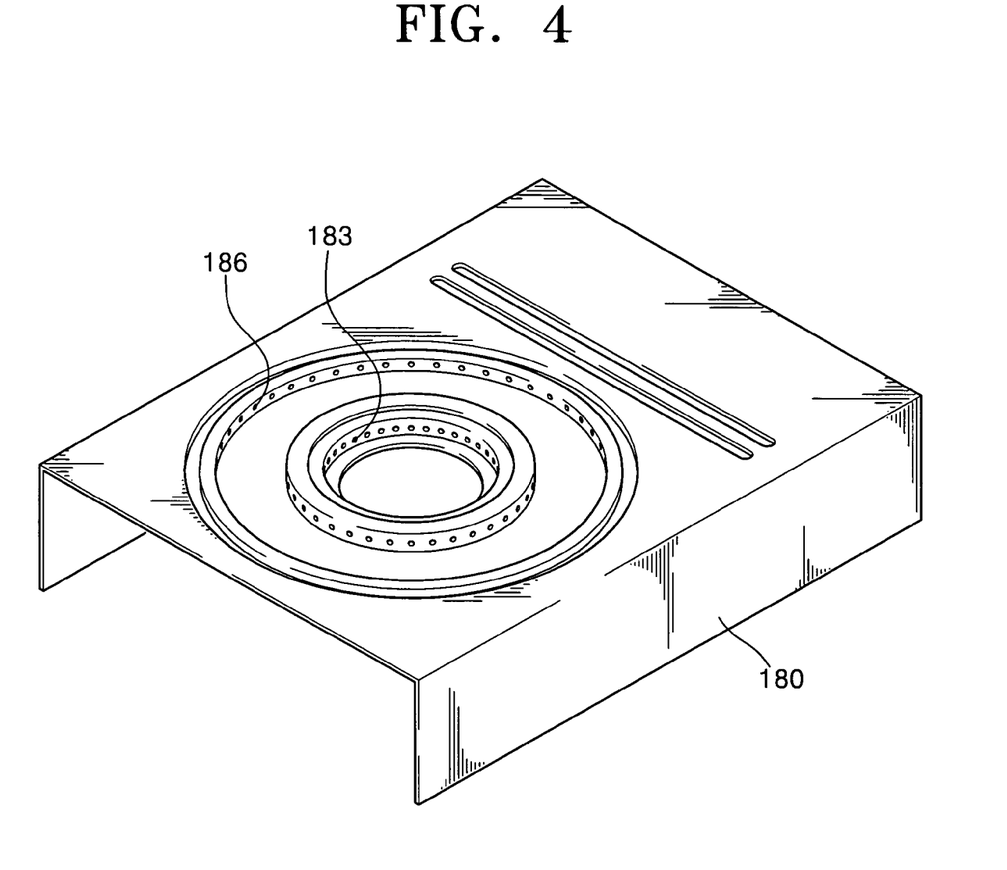
FIG. 4 is a partial cutting perspective view of a cover of FIG. 2.

Referring to FIGS. 3 and 4, a plurality of first through holes 186 are formed in the cover 180 between the extension portion 184 and the space portion 187 so that the extension portion 184 and the space portion 187 communicate with each other through the plurality of first through holes 186. A plurality of second through holes 183 are formed in the clamper mounting portion 181 at predetermined intervals so that the space portion 187 and the clamper mounting portion 181 communicate with each other through the plurality of second through holes 183.

In an embodiment of the invention, the height of the space portion 187 is larger than that of a gap C (FIG. 5) between the top surface of the optical disc D and a lower surface of the clamper mounting portion 181. This is because the space portion 187 operates similarly to the extension portion 184. That is, the space portion 187 decreases the density of the sound energy and reduces noise. Thus, air flow, generated by rotation of the optical disc D, passes through the extension portion 184 and noise is reduced. Further, when the air flow passes through the space portion 187, the density of the sound energy is decreased again, and noise is further reduced.

The space portion 187 decreases the sound energy density and serves as a path through which the air flows from the outer circumference to the inner circumference of the optical disc D.

The operation of the noise reducer having the above structure according to an exemplary embodiment of the present invention will now be described with reference to the drawings.

Referring to FIGS. 2 through 5, when the tray 150 on which the optical disc D is seated is loaded on the main frame 110, the optical disc D is seated on the turntable 131, and the clamper 190 is attached to the turntable 131 and fixed therein using the magnets 132 and 192.

Figure 5:
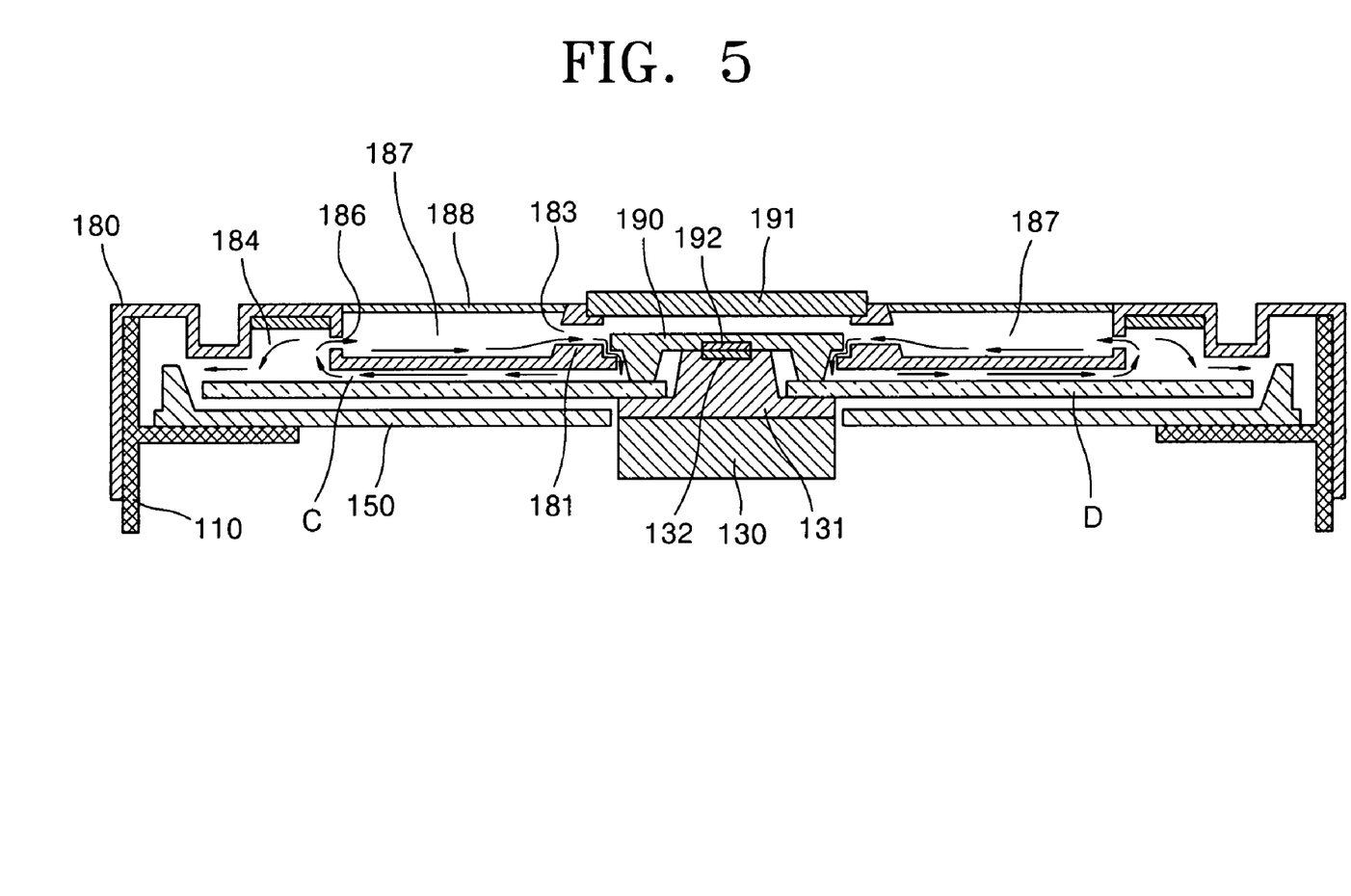
FIG. 5 is a cross-sectional view showing an operation of the noise reducer of FIG. 2.

When the turntable 131 is rotated by the spindle motor 130, the air around the optical disc D starts to flow. Since the outer circumference of the optical disc D is faster than the inner circumference thereof, a pressure in the inner circumference of the optical disc D is larger than a pressure in the outer circumference thereof. Thus, the air flows from the inner circumference to the outer circumference of the optical disc D through the gap C along an arrow direction.

When the air, flowing from the inner circumference to the outer circumference of the optical disc D, passes through the extension portion 184, the density of the air is decreased, and noise is reduced. Part of the air that has passed through the extension portion 184 then passes through the inner circumference of the optical disc D, and the rest thereof then passes through the first through holes 186 and flows to the space portion 187.

Since the area of the space portion 187 is large, the density of the air that has passed through the first through holes 186 is increased, and noise is reduced. In other words, the space portion 187 reduces noise, like the extension portion 184.

The air that has passed through the space portion 187 passes through the second through holes 183, flows into the clamper mounting portion 181, and is circulated from the inner circumference to the outer circumference of the optical disc D.

As is described above, in the optical disc drive according to the present invention, air flow generated around an optical disc by rotation of the optical disc, is circulated from an inner circumference to an outer circumference of the optical disc and from the outer circumference to the inner circumference of the optical disc such that noise is reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disc drive, in which an optical disk is rotated so that information is readable therefrom and writable thereonto, comprising:

a main frame, in which a turntable is provided;

a tray, on which the optical disc is mounted and which is slidable in the main frame;

a cover, which covers a top surface of the main frame and includes a clamper to fix the optical disc in the turntable; and a noise reducer, which is disposed in the cover and causes air that is generated by the rotation of the optical disc to circulate from an inner circumference to an outer circumference of the optical disc and from the outer circumference to the inner circumference thereof, to reduce a noise generated by the circulation of the air, wherein the noise reducer comprises:

a clamper mounting portion, on which the clamper is seated and which provides a path through which the circulation of the air flows;

a space portion, which has a predetermined concave area to surround the clamper mounting portion;

an extension portion adjacent to the space portion in which air density is decreased;

a plurality of first through holes formed in the cover at predetermined intervals so that the extension portion adjacent to the space portion and the space portion communicate with each other; and a plurality of second through holes formed in the clamper mounting portion at predetermined intervals so that the space portion and the clamper mounting portion communicate with each other.

2. The optical disc drive of claim 1, wherein the space portion is isolated from the outside by a sealing portion placed on a top surface of the space portion.

3. The optical disc drive of claim 1, wherein the height of the space portion is larger than that of a gap between the optical disc and the cover.

4. The optical disc drive of claim 1, wherein the space portion has a ring shape.

5. A noise reducer of an optical disk drive, in which an optical disk is rotated on a main frame so that information is readable therefrom and writable thereonto and such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to decrease the density of the circulated air to reduce the sound energy of the air; and a plurality of first through holes to allow the noise reduction section and the clamper mounting portion to communicate with each other such that circulated air enters the noise reduction section, wherein the noise reduction section comprises:

a space portion, which has a predetermined concave area to surround the clamper mounting portion;

an extension portion adjacent to the space portion in which air density is decreased when the optical disk is rotated; and a plurality of second through holes to allow the space portion and the extension portion to communicate with each other and to allow the space portion and the path of the circulation of air to communicate with each other.

6. The noise reducer according to claim 5, further comprising a clamper supporting portion, to support the clamper and which is formed under the clamper mounting portion and to protrude from the clamper mounting portion.

7. The noise reducer according to claim 5, further comprising a clamper cover to cover the clamper mounting portion after the clamper is mounted on the clamper mounting portion and which is formed on the surface of the clamper mounting portion.

8. The noise reducer according to claim 5, further comprising a magnet in the clamper to fix the optical disk.

9. The noise reducer according to claim 5, wherein the noise reduction section comprises a space portion having a concave area proximate to a top surface of the cover to surround the clamper mounting portion.

10. The noise reducer according to claim 9, wherein the noise reduction section comprises an extension portion in which the density of the circulated air is decreased.

11. The noise reducer according to claim 10, wherein the extension portion comprises an acoustic absorbent to absorb the sound energy and reduce noise.

12. A noise reducer of an optical disk drive, in which an optical disk is rotated on a main frame so that information is readable therefrom and writable thereonto and such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to decrease the density of the circulated air to reduce the sound energy of the air;

a plurality of first through holes to allow the noise reduction section and the clamper mounting portion to communicate with each other such that circulated air enters the noise reduction section, wherein the noise reduction section comprises a space portion having a concave area proximate to a top surface of the cover to surround the clamper mounting portion; and a sealing portion to isolate the space portion.

13. A noise reducer of an optical disk drive, in which an optical disk is rotated on a main frame so that information is readable therefrom and writable thereonto and such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to decrease the density of the circulated air to reduce the sound energy of the air; and a plurality of first through holes to allow the noise reduction section and the clamper mounting portion to communicate with each other such that circulated air enters the noise reduction section, wherein the noise reduction section comprises a space portion having a concave area proximate to a top surface of the cover to surround the clamper mounting portion, and the space portion has a height which is greater than a height between a top surface of the optical disk and a lower surface of the clamper mounting portion.

14. A noise reducer of an optical disk drive, in which an optical disk is rotated on a main frame so that information is readable therefrom and writable thereonto and such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to decrease the density of the circulated air to reduce the sound energy of the air;

a plurality of first through holes to allow the noise reduction section and the clamper mounting portion to communicate with each other such that circulated air enters the noise reduction section, wherein the noise reduction section comprises a space portion having a concave area proximate to a top surface of the cover to surround the clamper mounting portion, wherein the noise reduction section comprises an extension portion in which the density of the circulated air is decreased; and a plurality of second through holes to allow the extension portion and the space portion to communicate with each other.

15. A noise reducer of an optical disk drive, in which an optical disk is rotated on a main frame so that information is readable therefrom and writable thereonto and such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to decrease the density of the circulated air to reduce the sound energy of the air;

a plurality of first through holes to allow the noise reduction section and the clamper mounting portion to communicate with each other such that circulated air enters the noise reduction section, wherein the noise reduction section comprises a space portion having a concave area proximate to a top surface of the cover to surround the clamper mounting portion, wherein the noise reduction section comprises an extension portion in which the density of the circulated air is decreased; and a plurality of second through holes to allow the extension portion and the space portion to communicate with each other, further comprising the second through holes to allow the space portion and the path of the circulation of air to communicate with each other.

16. A noise reducer of an optical disk drive, in which an optical disk is rotated on a main frame so that information is readable therefrom and writable thereonto such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to surround the clamper mounting portion and to decrease the density of the circulated air to reduce the sound energy of the air; and first through holes to allow the noise reduction section and the clamper mounting portion to communicate with each other such that circulated air enters the noise reduction section, wherein the noise reduction section comprises:

a space portion, which has a predetermined concave area to allow the noise reduction section to surround the clamper mounting portion;

an extension portion adjacent to the space portion in which air density is decreased when the optical disk is rotated; and second through holes to allow the space portion and the extension portion to communicate with each other and to allow the space portion and the path of the circulation of air to communicate with each other.

17. The noise reducer according to claim 16, further comprising a clamper supporting portion, to support the clamper and which is formed under the clamper mounting portion and to protrude from the clamper mounting portion.

18. The noise reducer according to claim 16, further comprising clamper cover to cover the clamper mounting portion after the clamper is mounted on the clamper mounting portion and which is formed on the surface of the clamper mounting portion.

19. The noise reducer according to claim 16, further comprising a magnet in the clamper to fix the optical disk.

20. The noise reducer according to claim 16, wherein the noise reduction section comprises a space portion having a concave area proximate to a top surface of the cover to surround the clamper mounting portion.

21. A noise reducer of an optical disk drive, in which an optical disk is rotated on a main frame so that information is readable therefrom and writable thereonto such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to surround the clamper mounting portion and to decrease the density of the circulated air to reduce the sound energy of the air;

first through holes to allow the noise reduction section and the clamper mounting portion to communicate with each other such that circulated air enters the noise reduction section, wherein the noise reduction section comprises a space portion having a concave area proximate to a top surface of the cover to surround the clamper mounting portion; and a sealing portion to isolate the space portion.

22. A noise reducer of an optical disk drive, in which an optical disk is rotated on a main frame so that information is readable therefrom and writable thereonto such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to surround the clamper mounting portion and to decrease the density of the circulated air to reduce the sound energy of the air; and first through holes to allow the noise reduction section and the clamper mounting portion to communicate with each other such that circulated air enters the noise reduction section, wherein the noise reduction section comprises a space portion having a concave area proximate to a top surface of the cover to surround the clamper mounting portion, wherein the space portion has a height which is greater than a height between a top surface of the optical disk and a lower surface of the clamper mounting portion.

23. A noise reducer of an optical disk drive, in which an optical disk is rotated on a main frame so that information is readable therefrom and writable thereonto such that sound energy is generated by a circulation of air caused by the rotation of the optical disk, the noise reducer comprising:

a cover, to cover a top surface of the main frame, including a clamper to fix the optical disc during the rotation;

a clamper mounting portion, on which the clamper is seated, to define a path of the circulation of air;

a noise reduction section to surround the clamper mounting portion and to decrease the density of the circulated air to reduce the sound energy of the air;

first through holes to allow the noise reduction section and the clamper mounting portion to communicate with each other such that circulated air enters the noise reduction section, wherein the noise reduction section comprises a space portion having a concave area proximate to a top surface of the cover to surround the clamper mounting portion, wherein the noise reduction section comprises an extension portion in which the density of the circulated air is decreased; and second through holes to allow the extension portion and the space portion to communicate with each other.

24. An optical disc drive, in which an optical disk is rotated so that information is readable therefrom and writable thereonto, comprising:

a main frame, in which a turntable is provided;

a tray, on which the optical disc is mounted and which is slidable in the main frame;

a cover, which covers a top surface of the main frame and includes a clamper to fix the optical disc in the turntable;

a noise reducer, which is disposed in the cover and causes air that is generated by the rotation of the optical disc to circulate from an inner circumference to an outer circumference of the optical disc and from the outer circumference to the inner circumference thereof, to reduce a noise generated by the circulation of the air, wherein the cover is above the disc, with the air passing between the cover and the disc from the inner circumference to the outer circumference;

a sealing portion above the cover defining a space between the sealing portion and the cover; and a through hole formed in the cover in fluid communication with the space to pass air from between the disc and the cover into the space and from the outer circumference to the inner circumference via the space.

* * * * *